April 29, 1969 A. B. AMIDON ET AL 3,441,411
IMAGE FORMATION THROUGH THE CHEMICAL REACTION OF
PHOTOCHROMIC MATERIALS
Filed Oct. 1, 1965

INVENTORS
CARL BRYNKO
ALAN B. AMIDON
BY Ronald Zibelli
James J. Ralabate
ATTORNEYS

United States Patent Office 3,441,411
Patented Apr. 29, 1969

3,441,411
IMAGE FORMATION THROUGH THE CHEMICAL REACTION OF PHOTOCHROMIC MATERIALS
Alan B. Amidon, Penfield, and Carl Brynko, West Webster, N.Y., assignors to Xerox Corporation, Rochester, N.Y., a corporation of New York
Filed Oct. 1, 1965, Ser. No. 492,204
Int. Cl. G03c 1/40, 5/40
U.S. Cl. 96—27         11 Claims

ABSTRACT OF THE DISCLOSURE

An image is formed by exposing an imaging layer comprising a photochromic material to actinic electromagnetic radiation in image configuration to convert at least a portion of the photochromic material from one photochromic state to another, contacting the photochromic material with a reagent which is reactive with only one form of the photochromic material and supplying sufficient heat to cause a reaction between the reagent and one form of the photochromic material.

---

This invention relates in general to a novel imaging system and, more specifically, to an imaging system employing light induced changes in the chemical reactivity of organic photochromic compounds.

Materials which undergo reversible photoinduced color change are referred to as photochromic. In the absence of actinic radiation these materials have a relatively stable configuration with a characteristic absorption spectrum. However, when a photochromic material is exposed to actinic radiation such as ultraviolet light, the absorption spectrum changes drastically so that the appearance of the material changes from colorless to red, red to green or the like. These property changes are believed to occur because of changes in the molecular or electronic configuration of the material from a lower to a higher energy state. These changes occur because the photochromic materials generally have very efficient routes for the internal conversion of absorbed, excited state, electronic energy into vibrational and torsional twisting modes of the molecule upon exposure to light. This conversion may, for example, result in the isomerization of the molecule. The conversion of each molecule normally takes place at an extremly rapid speed but actual observation of a change in color in conventional systems takes longer because of the relatively low concentration produced per unit time and the depletion of the excited colored form by the competing but slower reconversion to the lower unexcited form. Accordingly, photochromic materials of lower conversion efficiency tend to produce pale color changes at best.

Unfortunately, the higher, colored form of the photochromic material exists in an excited, unstable condition which reverts to the lower form with its original absorption band and color after the source of actinic radiation is removed. Since imaging techniques proposed in the prior art employ the color change to make the image, these materials cannot be used in permanent imaging systems. Although an enormous amount of time, money and effort has been expended by many research organizations on attempting to stabilize the higher forms of a great many different photochromic compounds so as to make them suitable for use in practical imaging systems and, although some success has been achieved in slowing down the reconversion of the higher to the lower form of some photochromic compounds with various modifications of their substitutents, no one has to date yet succeeded in permanently stabilizing these higher forms. Additional effort has been devoted to the problem of achieving maximum color change from the lower to the higher form of various photochromic compounds, but even had these goals been achieved the problem of de-activating the lower form of photochromic material in background areas would still remain. In essence then, there have been two fixing problems in photochromic imaging involving both the stabilization of the higher color form in exposed areas and the deactivation of the lower uncolored form in background areas of the image, and neither of these problems has been effectively solved. Consequently, the phenomenon of photochromism has remained largely a laboratory curiosity rather than an effective and commercially acceptable means of imaging.

It is accordingly an object of this invention to provide a novel imaging system.

It is a further object of the present invention to provide a novel imaging method based on the use of organic photochromic compounds.

Another object of this invention is to provide an imaging system which can effectively employ even those photochromic materials which exhibit little or no visible change in color on exposure.

A still further object of the invention is to provide an imaging method and apparatus utilizing photochromic compounds in which the image generated by image-wise exposure of the compound serves only as a temporary latent image for the developing step which produces a permanent image that in no way depends upon the permanency of the higher form of photochromic compound itself.

The above and still further objects of the present invention are accomplished, generally speaking, by providing a system in which a layer including a photochromic compound is exposed to an image with actinic electromagnetic radiation. This exposure source may constitute a source of visible light, ultraviolet light, X-ray or any other radiation source which is capable of converting the particular photochromic compound from one form to the other. After image-wise conversion of at least a portion of the photochromic layer from one state to the other, the photochromic layer is exposed to a selected reagent and because of the marked difference in reactivity with this reagent by the two states of the same photochromic compound, either the exposed or unexposed portions react with the reagent to form a colored, crosslinked or otherwise modified permanent compound. It should be emphasized here that the exposure must only convert enough photochromic molecules to produce a significant difference between the reaction rates of the exposed and unexposed areas with the reagent. Because of the relatively small number of molecules which must be converted to fulfill this requirement with some materials, a visible color change need not necessarily be produced in all instances. The reagent may either be applied before or after exposure, for example as a liquid, to the imaging layer or may be included in the original layer when it is coated. It may also be desirable to heat the layer after exposure to impart increased reactivity and thus accelerate the reaction.

The photochromic layer may be composed solely of one or more photochromic compounds providing that it has sufficient strength. For convenience, however, the photochromic material will generally be dissolved in solid solution or dispersed in a natural or synthetic resin. This resin may be thought of as a binder or matrix for the photochromic material. The use of such a resin as a binder or matrix for the photochromic compound permits the choice of the photochromic compound to be made from a larger group of materials including even those which have relatively low strength and poor film forming ability. Since many photochromic compounds are relatively expensive, the use of a resin also serves to decrease the overall cost of the imaging layer.

In order that the invention will be more clearly understood, reference is now made to the accompanying drawings in which an embodiment of the invention is illustrated by way of example and in which.

Figure 1:
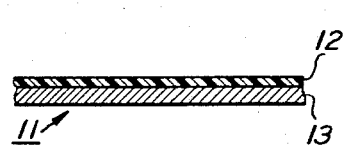
FIGURE 1 is a side sectional view of an imaging member made according to the invention.

Referring now to FIGURE 1, there is seen an imaging member generally designated 11 made up of a photoresponsive layer 12 on a supporting substrate 13. Any convenient material, such as copper, brass, aluminum, polyethylene terephthalate, polycarbonates, polyurethanes, glass or the like, may be employed to fabricate layer 13 so that the substrate will provide mechanical strength to the imaging member especially if it is softened to facilitate development. Imaging layer 12, may as stated above, consist entirely of a photochromic compound providing that it is strong enough to have structural integrity when coated.

Since most photochromic compounds are relatively expensive as compared with resins which are suitable for use in combination therewith and since some photochromics have low physical strength, the photochromic will generally be dissolved in or dispersed in a resin. Any suitable resin may be used. Typical resins include Staybelite Ester 10 (a glycerol ester of partially (50%) hydrogenated rosin sold by the Hercules Powder Co. of Wilmington, Del.); Velsicol EL-11, a terpolymer of styrene, indene and isoprene, marketed by the Velsicol Chemical Co. of Chicago, Ill.; polyalpha-methyl styrene; Piccolyte S-70 and S-100 (polyterpene resins made predominantly from beta pinene available from the Pennsylvania Industrial Chemical Co. and having ring and ball melting points of 70° C. and 100° C., respectively); Piccopale 70SF and 85 (nonreactive olefin-diene resins, available from the Pennsylvania Industrial Chemical Co. having melting points of 70° C. and 85° C. and molecular weights of 800 and 100, respectively); Piccodiene 2212 (a styrene-butadiene resin available from the same company); Piccolastic A-75, D-100 and E-100 (polystyrene resins with melting points of 75° C., 100° C. and 100° C. available from the same company); Neville R-21, R-9 and Nevillac Hard (cumarone-indene resins); Amberol ST137X (an unreactive, unmodified phenol-formaldehyde resin available from Rohm & Haas); ethyl cellulose; ethyl hydroxy cellulose; nitrocellulose; ethyl acrylate polymer, methyl acrylate polymer; methyl methacrylate polymer; Aroclor 1242 (a chlorinated polyphenyl); Pliolite AC (a styrene-acrylate copolymer); Pliolite VTAC (a vinyl toluene-acrylate copolymer); and Neolyl 23 (an alkyd resin available from Hercules Powder Co.) chlorinated rubber; paraffin wax; polycarbonates; polyurethanes; epoxies; polyvinyl chloride; polyvinylidene chloride; polyvinyl butyral; shellac; amine-formaldehydes; polyvinyl acetals; silicones; phenoxies; polyvinyl fluorides and mixtures and copolymers thereof.

As stated above, the percentage of photochromic compound in the imaging coating 12 may range anywhere from 100% by weight of photochromic compound down to about 1% by weight of photochromic with the remainder being a resin of the type described herein. Any suitable photochromic compound may be employed. Typical photochromic compounds include:

Spiropyrans such as 1,3,3-trimethyl-6′-nitro-8′-allyl-spiro (2′H-1′-benzopyran-2,2′-indoline);
1,3,3-trimethyl-5,6′-dinitro-spiro (2′H-1′-benzopyran-2,2′-indoline);
1,3,3-trimethyl-7′-nitro-spiro (2′H-1′-benzopyran-2,2′-indoline);
3-methyl-6-nitro-spiro-[2H-1-benzopyran-2,2′-(2′H-1′-beta-naphthopyran)];
1,3,3-trimethyl-8′-nitro-spiro (2′H-1′-benzopyran-2,2′-indoline);
1,3,3-trimethyl-6′-methoxy-8′-nitro-spiro (2′H-1′-benzopyran-2,2′-indoline);
1,3,3-trimethyl-7-methoxy-7′ chloro-spiro (2′H-1′-benzopyran-2,2′-indoline);
1,3,3-trimethyl-5 chloro-5′ nitro-8′-methoxy-spiro (2′H-1′-benzopyran-2,2′-indoline);
1,3-dimethyl-3-isopropyl-6′ nitro-spiro (2′H-1′-benzopyran-2,2′-indoline);
1-phenyl-3,3-dimethyl-6′-nitro-8′-methoxy-spiro (2′H-1′-benzopyran-2,2′-indoline);
7′-nitro-spiro-[xantho-10,2′ (2′H-1′-benzobetanaphthopyran)];
3,3′-dimethyl-6′-nitro-spiro (2′H-1′-benzopyran-2,2′-benzothiazole);
3,3′-dimethyl-6′-nitro-spiro (2′H-1′-benzopyran-2,2′-benzo-oxazole);
1,3-trimethyl-nitro-spiro (2′H-1′-benzopyran-2,2′-indoline);
6′-nitro-8′-methoxy-1,3,3-trimethylindolinobenzopyrylospiran;
6′-nitro-1,3,3-trimethylindolinobenzopyrylospiran;
8′-allyl-1,3,3-trimethylindolinobenzopyrylospiran;
8′-carbomethoxy-1,3,3-trimethylindolinobenzopyrylospiran;
8′-methoxy-1,3,3-trimethylindolinobenzopyrylospiran;
6′,8′-dinitro-1,3,3-trimethylindolinobenzopyrylospiran;
7′-nitro-1,3,3-trimethylindolinobenzopyrylospiran;
8′-nitro-1,3,3-trimethylindolinobenzopyrylospiran;
6′,8′-dibromo-1,3,3-trimethylindolinobenzopyrylospiran;
6′-chloro-8′-nitro-1,3,3-trimethylindolinobenzopyrylospiran;
5-nitro-6′-nitro-1,3,3-trimethylindolinobenzopyrylospiran;
6′-nitro-8′-fluoro-1,3,3-trimethylindolinobenzopyrylospiran;
6′-methoxy-8′-nitro-1,3,3-trimethylindolinobenzopyrylospiran;
5′-nitro-8′-methoxy-1,3,3-trimethylindolinobenzopyrylospiran;
6′-bromo-8′-nitro-1,3,3-trimethylindolinobenzopyrylospiran.

Anthrones such as 9-xanthylidene anthrone;
4,4′-methylanthrone;
3-chloro-10-(9′-xanthylidene)-anthrone;
3-methyl-10-(9′-xanthylidene)-anthrone;
4′-chloro-10-(9′-xanthylidene)-anthrone; and
10′-9′-2′-methyl xanthylidene)-anthrone.

Sydnones such as

N-(3-pyridyl)-sydnone;
N-benzylsydnone;
N-p-methylbenzyl-sydnone;
N-3,4-dimethylbenzylsydnone;
N-p-chlorobenzylsydnone;
N,N′-ethylene-bis-sydnone; and
N,N′-tetramethylenebissydnone.

Anils such as salicylidene aniline;
5-bromo salicylidene-alpha-naphthylamine;
salicylidene-m-phenylenediamine;
salicylidene-m-toluidene;
salicylidene 3,4-xylidene;
salicylidene-p-anisidine;
o-nitrobenzidene-p-aminobiphenyl;
o-nitrobenzidene-m-nitroaniline o-nitrobenzidene-p-phenetidine;
salicylidene-p-aminobenzoic acid;
p-hydroxy benzidene-p-bromoaniline;

p-hydroxy-benzidene 2,4-xylidene;
2-hydroxy-3-methoxybenzidene 2,5-xylidine; and
salicylidene-o-chloroaniline.

Hydrazones such as the 2,4-dinitro-phenylhydrazone of 5-nitro-salicylaldehyde;
benzaldehyde beta-naphthyl-hydrazone;
benzaldehyde anisylhydrazone;
benzaldehyde-m-chloro-phenylhydrazone;
benzaldehyde-p-bromophenylhydrazone;
cinnamaldehyde phenylhydrazone;
cinnamaldehyde beta-naphthylhydrazone;
cinnamaldehyde m-tolylhydrazone;
cinnamaldehyde p-tolylhydrazone;
cinnamaldehyde 3,4-xylhydrazone;
p-dimethylamino benzaldehyde beta-naphthylhydrazone;
2-furaldehyde beta-naphthylhydrazone;
1-phenol-1-hexen-3-one-phenylhydrazone;
piperonal anisylhydrazone;
piperonal m-chloro-phenylhydrazone;
piperonal beta-naphthylhydrazone;
piperonal m-tolylhydrazone;
p-tolualdehyde phenylhydrazone;
vanillin beta-naphthylhydrazone.

Osazones such as benzil beta-naphthyl-osazone;
benzyl m-tolylosazone;
benzyl 2,4-xylylosazone;
4,4'-dimethoxy benzyl beta-naphthylosazone;
4,4'-dimethoxy benzil phenylosazone;
4,4'-dimethoxy benzyl-2,4-xylylosazone;
3,4,3',4'-bis(methylenedioxy) benzyl alpha-naphthyl-osazone;
3,4,3',4'-bis(methylene-dioxy) benzyl 2,4-xylylosazone.

Semicarbazones such as chalcone semicarbazone;
chalcone phenyl semicarbazone;
2-nitrochalcone semicarbazone;
3-nitrochalcone semicarbazone;
cinnamaldehyde semicarbazone;
cinnamaldehyde thiosemicarbazone;
o-methoxy cinnamaldehyde semicarbazone;
o-methoxy cinnamaldehyde thiosemicarbazone;
o-methoxy cinnamaldehyde phenylsemicarbazone;
1-(4-methoxyphenyl)-5-methyl-1-hexen-3-one-semicarbazone;
1-(1-naphthyl)-1-hexen-3-one-semicarbazone;
1-phenyl-1-penten-3-one-semicarbazone.

Stilbene derivatives such as 4,4'-diformamido-2,2'-stilbene disulfonic acid;
4,4'-diacetamido-2,2'-stilbene disulfonic acid and its sodium, potassium barium, strontium, calcium, magnesium and lead salts;
4,4'-bis(4-acetamidobenzoyleneamido)-2,2'-stilbene disulfonic acid;
4,4'-bis(p-(p-acetamido-benzamido)benzamido)-2,2'-stilbene disulfonic acid.

Fulgides (substituted succinic anhydrides) such as alpha-anisyl-gamma-phenyl fulgide;
alpha, gamma-dianisyl fulgide;
alpha, gamma-dicumyliso fulgide;
alpha, gamma-diphenyl fulgide;
alpha, gamma-distyryl fulgide;
alpha-piperonyl-gamma-phenyl fulgide;
tetraphenyl fulgide.

Amino-camphor compounds such as 3-(p-dimethyl aminophenylamino)-camphor and
3-(p-diethylaminophenylamino)-camphor.

Thio indigo dyes.
o-Nitrobenzyl derivatives such as 2-(2',4'-dinitrobenzyl) pyridine;
2,4,2'-trinitrodiphenylmethane;
2,4,2',4',2'',4''-hexanitro-triphenylmethane;
ethyl bis (2,4-dinitrophenyl) acetate;
4-(2'-nitro-4'-cyanobenzyl) pyridine.
3,3'-dinitro-4,4'-bis(2-pyridylmethyl)-azoxybenzene; and
4-(2'-nitro-4'-cyanobenzyl) pyridine.

The spiropyrans are, however, a preferred class of materials owing to their superior and more sensitive imaging capabilities. Whether photoresponsive layer 12 consists of a pure photochromic compound or a blend of a photochromic compound with a resin as described above, it may be coated on the substrate or formed into a self-supporting layer by a convenient technique such as dip coating, extrusion, whirl coating, casting or the like using either a hot melt or a solution of the materials to be coated.

Dyes, pigments or other coloring agents may also be added to the imaging layer to give it a color which contrasts strongly with the color of the image after development.

In an optional but preferred embodiment of the invention the imaging layer also includes the reagent which selectively reacts with one form of the photochromic compound and not with the other form or at least reacts at a faster rate with one form than with the other. By either including this reagent in the imaging layer itself or applying it to the imaging layer just prior to exposure, the reaction can begin to take place immediately upon the formation of the excited form of the photochromic in image configuration. Although the reaction itself may be accelerated in many instances by the addition of mild heating, the use of a pair of reaction partners (photochromic and reagent) which react at a relatively slow rate even when the photochromic is excited but whose reaction rate can be markedly speeded up by heating is particularly desirable in certain instances. For example, if the imaging process begins with a uniformly excited photochromic compound throughout the whole surface of the imaging layer followed by image-wise deactivation, the rate of reaction between the excited form of the photochromic compound and the reagent should be low until heat is applied because if it is not the reaction will tend to take place before an image-wise pattern is formed.

Figure 2:
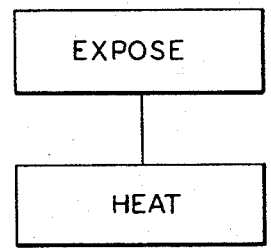
FIGURE 2 is a flow diagram of the process steps of the invention.

As shown in FIGURE 2 the basic steps involved in carrying out the process of this invention involve exposing the photo-responsive layer 12 of the imaging layer 11 to an image-wise pattern of actinic electromagnetic radiation and treating the exposed layer with a reagent which selectively reacts with one form of the photochromic compound (usually the excited form). In exposing to the image to be reproduced, any source of electromagnetic radiation which is actinic to the photochromic material may be employed. In the case of most photochromic compounds in their lower or unexcited forms an ultraviolet radiation source may be conveniently employed to expose the material in image-wise configuration so as to convert exposed areas to the higher or excited form of the material, although light of this short wavelength is not always required. Since many photochromic materials in their higher or excited forms may be "triggered" or caused to revert to the lower, unexcited form by exposure to visible light, a light source in the visible range (from about 4,000–7,500 angstrom units) may be conveniently empolyed for image-wise exposure of a photochromic film which had initially been uniformly converted to the higher or excited form. This type of exposure will then convert exposed areas to the unexcited or lower form of the photochromic material while the background or unexposed areas remain in the excited form. Providing that the image is developed before the background areas of the photochromic material revert to the lower unexcited form this technique results in positive to negative imaging. The intensity of the exposure need not necessarily be strong enough to produce an intense color change in the photochromic compound since with most materials this requires a conversion of a gross amount of the photochromic from one form to the other, while to be operative in the process of this invention only enough photochromic material must be converted so that a differential "reactivity" pattern can be formed on imaging layer 12. The term "photochromic" should be understood in this context as it is used throughout the specification and claims.

Once exposure is complete the imaging layer may be treated with the reagent although, as brought out supra, it is preferable to pretreat with the reagent or include it in the imaging layer itself.

Selection of the particular reagent to be employed will, of course, depend upon the particular photochromic compound employed and, more particularly, upon the particular reactive groups which either exist initially or are formed on the photochromic compound by exposure. It is generally preferred that this reagent will form a permanently coupled colored compound with one form only of the photochromic; however, the formation of compounds with desirable characteristics other than color, such as insolubility, hydrophilic or hydrophobic characteristics and the like, are also contemplated by the invention. In short then, any suitable reagent may be employed in carrying out the invention. Take, for example, photochromic compounds from the spiropyran family, such as 1,3,3-trimethylindolino-6'-nitropyrilospiran. Conversion from the closed colorless form to the open colored form by bond rupture of the pyran ring leaves behind a partially charged oxygen on the nitrobenzene ring, as shown below:

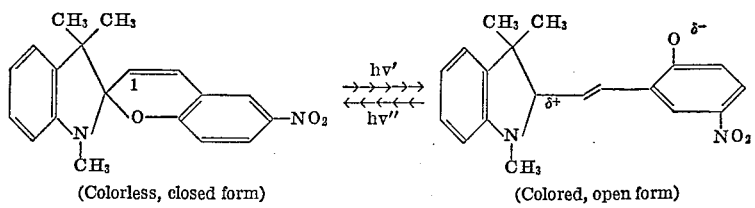

(Colorless, closed form)      (Colored, open form)

Where $\delta^+$ and $\delta^-$ are partial charges.

Since the partially charged oxygen has phenol functionality, any reagent which will react with nitrophenol to form a colored or fluorescent compound may be employed to produce a permanent colored image in those areas where the open form of the photochromic is produced. Accordingly, with this phenol functionality of the open form of the spiropyran molecule the reaction may be carried out with suitable acids, anhydrides, aldehydes or the like whether organic or inorganic. It has been found, however that anhydrides such as phthalic anhydride, maleic anhydride, etc. form a preferred class of reagents with the spiropyrans especially when they are included in the original imaging layer because the light exposure which is employed to excite the photochromic compound also raises the level of excitation of the anhydride imparting an increased degree of reactivity to these materials.

Figure 3:
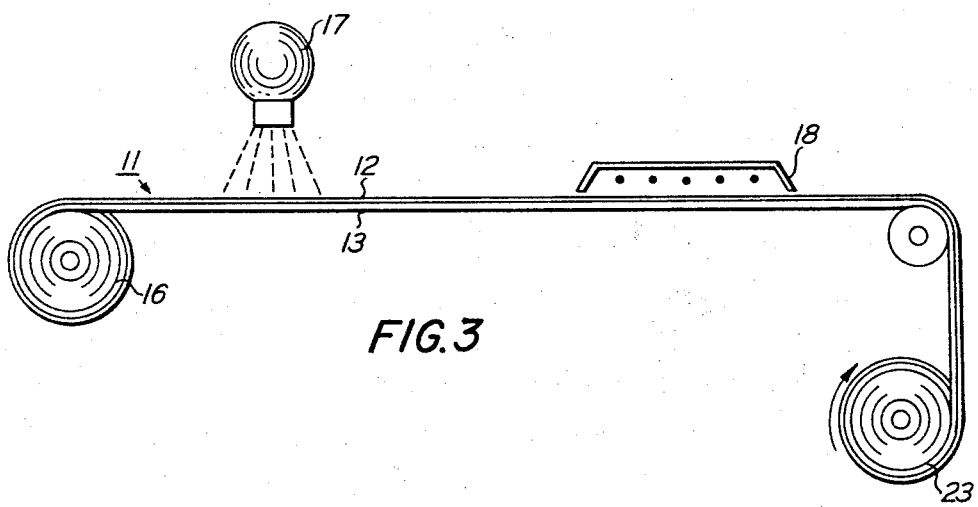
FIGURE 3 is a side sectional view of an illustrative embodiment of an apparatus for imaging according to the invention.

In FIGURE 3 there is illustrated a side sectional view of an illustrative embodiment of an apparatus for imaging according to the invention. In this apparatus imaging web 11 consisting of the photochromic imaging layer 12 on a substrate 13 comes off a supply roll 16 and passes under a projector 17. This projector shines a pattern of light and shadow corresponding to the image to be reproduced with an actinic light source an the photochromic layer of the imaging member so as to convert the photochromic material therein from one photochromic state to another in image-wise configuration. In the illustrated embodiment of the invention the reagent is also included in photochromic layer 12; however, in an alternative type of apparatus the reagent may be kept separate and applied to the imaging layer after it passes beneath the projector as with an atomizer or spray gun. Following exposure imaging web 11 passes beneath a radiant heater 18 which heats the imaging web so as to accelerate the reaction between the excited form of the photochromic compound and the reagent included in the web. This forms a permanent colored compound in image-wise configuration on the web which is then wound up on takeup reel 23.

The following illustrative examples of preferred embodiments of the invention are now given to enable those skilled in the art to more clearly understand and practice the invention described above. Unless otherwise indicated, all parts and percentages are taken by weight.

Example I

Two grams of 6'-nitro-1,3,3-trimethylindolinobenzopyrylospiran, 4 grams of Amberol ST-137X resin (described above) and 1 gram of phthalic anhydride are dissolved in 93 grams of toluene. This solution is dip coated in the dark to a thickness of about 2 microns on an aluminum plate and air dried. The dried film is then exposed to an image transparency with a 9-watt fluorescent light available from the Eastern Corporation of Westbury, Long Island under the tradename Blacklite using a filter which passes about a 10 angstrom bandwidth centered on 3660 angstroms. After image-wise exposure and mild heating a yellow image is seen to form on the film which shows strong orange fluorescence upon ultraviolet exposure. The maroon color ordinarily produced by ultraviolet exposure cannot be produced any more in these yellow areas.

Examples II and III

The procedure of Example I is repeated with the exception that in Example II 4 grams of the resin and 4 grams of the 6'-nitro-1,3,3-trimethylindolinobenzopyrylospiran are used in the coating solution with 1 gram of phthalic anhydride, while in Example III the ratio is 1 gram of resin to 2 grams of the same photochromic spiran compound with the same amount of the anhydride. Each of these produce about equal results with those produced by Example I, except for slightly improved sharpness in the developed image as the spiran concentration is increased.

Examples V-XVI

The procedure of Example I is followed exactly with the exception that the following resins are substituted for the Staybelite Ester resin of Example I in Examples V-XVI, respectively; Piccolyte S-70, Piccolyte S-100, Piccopale 70SF, Piccopale 85, Piccodiene 2212, alpha-methylstyrene polymer, Staybelite Ester 10, Piccolastic D-100, Piccolastic E-100, Neville R-9, Neville R-21 and Nevillac Hard. All produce about the same results as Example I.

Examples XVII and XVIII

In Examples XVII and XVIII the procedure of Example I is repeated except that the photochromic compound employed is 9-xanthylidene anthrone in Example XVII and 2,4-dinitro phenylhydrazone of 5-nitro salicylaldehyde in Example XVIII.

Although specific materials and conditions are set forth in the above examples, these are merely illustrative of the present invention. Various other materials, such as any of the typical photochromic and/or resins listed above which are suitable, may be substituted for the materials listed in the examples with similar results. The films of this invention may also have other materials mixed, dispersed, copolymerized or otherwise added thereto to enhance, sensitize, synergize or otherwise modify the properties thereof. Many modifications and/or additions to the process will readily occur to those skilled in the art upon reading this disclosure, and these are intended to be encompassed within the spirit of the invention.

What is claimed is:

1. A photographic method comprising exposing an imaging layer comprising an organic photochromic material to actinic electromagnetic radiation in image configuration of sufficient energy to convert at least a portion of said material from one photochromic state to another, contacting said photochromic material with a reagent which is reactive with only one form of said photochromic material and supplying sufficient heat energy to said photochromic material to cause a reaction between said reagent and one form of said photochromic material thereby forming a permanent differentially ascertainable reaction product in said layer.

2. A method according to claim 1 in which said photochromic material is initially in its lower, unexcited state including exposing said imaging layer with an electromagnetic radiation source of sufficient energy to convert exposed areas thereof to a higher excited photochromic state.

3. A method according to claim 1 in which said photochromic material is initially in its higher excited state including exposing said imaging layer with an electromagnetic radiation source of sufficient energy to convert exposed areas thereof to a lower unexcited photochromic state.

4. A method according to claim 1 including using a photochromic material which has phenol functionality in only one of its forms and an acid anhydride reagent.

5. A method according to claim 1 in which said imaging layer comprises said photochromic material and said reagent prior to exposure to said actinic electromagnetic radiation.

6. A method according to claim 1 in which said imaging layer comprises up to about 99 percent by weight of a resin binder.

7. A photographic method comprising exposing an imaging layer comprising a photochromic 1,3,3-trimethylindolinobenzopyrylospiran material to actinic electromagnetic radiation in image configuration of sufficient energy to convert at least a portion of said material from one photochromic state to another, contacting said photochromic material with a color forming reagent for only the excited open form of said photochromic material and supplying sufficient heat energy to cause a reaction between said reagent and said excited open form of said photochromic material thereby forming a permanent differentially ascertainable reaction product in said imaging layer.

8. A method according to claim 7 in which said imaging layer comprises said photochromic material and said reagent prior to exposure to actinic electromagnetic radiation.

9. A method according to claim 7 in which said imaging layer comprises up to about 99 percent by weight of a resin binder.

10. A method according to claim 7 in which said photochromic material comprises 6'-nitro-1,3,3-trimethylindolinobenzopyrylospiran.

11. A method according to claim 7 in which said reagent comprises an acid anhydride.

References Cited

UNITED STATES PATENTS 3,346,385   10/1967   Fortis _____ 96—36

J. TRAVIS BROWN, *Primary Examiner.*

J. R. EVERETT, *Assistant Examiner.*

U.S. Cl. X.R.

96—90